(12) United States Patent
Guttenberger

(10) Patent No.: US 10,458,519 B2
(45) Date of Patent: Oct. 29, 2019

(54) GEARED MOTOR, AND METHOD FOR INSTALLING A GEARED MOTOR

(71) Applicant: BÜHLER MOTOR GMBH, Nürnberg (DE)

(72) Inventor: Richard Guttenberger, Greding (DE)

(73) Assignee: BÜHLER MOTOR GMBH, Nürnberg (DE)

( * ) Notice: Subject to any disclaimer, the term of this patent is extended or adjusted under 35 U.S.C. 154(b) by 51 days.

(21) Appl. No.: 15/724,565

(22) Filed: Oct. 4, 2017

(65) Prior Publication Data

US 2018/0023669 A1    Jan. 25, 2018

Related U.S. Application Data

(63) Continuation of application No. PCT/DE2016/200176, filed on Apr. 7, 2016.

(30) Foreign Application Priority Data

Apr. 16, 2015 (DE) .................. 10 2015 206 933

(51) Int. Cl.
   *F16H 1/46*       (2006.01)
   *F16H 57/023*     (2012.01)
   (Continued)

(52) U.S. Cl.
   CPC ............. *F16H 1/46* (2013.01); *F16H 57/023* (2013.01); *F16H 57/025* (2013.01);
   (Continued)

(58) Field of Classification Search
   CPC ........ F16H 1/46; F16H 57/082; F16H 57/025; F16H 2200/2007–2200/2017;
   (Continued)

(56) References Cited

U.S. PATENT DOCUMENTS 5,195,389 A    3/1993  Isozumi
5,551,927 A *  9/1996  Enzmann ................ B25B 21/00
                                                464/39
(Continued)

FOREIGN PATENT DOCUMENTS

DE    19729988 C1    8/1998
DE    10300641 A1    7/2004
(Continued)

OTHER PUBLICATIONS

Search Report dated Mar. 24, 2016, issued in counterpart German application No. 10 2015 206 933.8 (10 pages).
(Continued)

*Primary Examiner* — Jacob S. Scott
*Assistant Examiner* — Lillian T Nguyen
(74) *Attorney, Agent, or Firm* — Westerman, Hattori, Daniels & Adrian, LLP

(57) ABSTRACT

A geared motor, comprising a direct current motor having a motor shaft, a planetary gear unit with sun wheels, planetary gears, a ring gear, a gear unit casing, a gear unit output shaft, and pinion cages. A plate axially holds the sun wheels, the planetary gears and the pinion cages in the gear unit casing. The plate has a shaft passage to form a preinstallation module. One of the sun wheels has a central shaft receptacle which is formed with a positive fit contour acting in the rotation direction and coupled in a rotationally fixed manner with the motor shaft via a corresponding positive fit contour; and wherein, in the preinstallation module, an engagement of teeth of one of the sun wheels with teeth of one of the planetary gears is provided both before and after a final installation of the direct current motor at the preinstallation module.

19 Claims, 3 Drawing Sheets

(51) Int. Cl.
*H02K 7/116* (2006.01)
*F16H 57/025* (2012.01)
*F16H 57/08* (2006.01)
*F16H 57/00* (2012.01)
*F16H 57/02* (2012.01)

(52) U.S. Cl.
CPC .......... *F16H 57/082* (2013.01); *H02K 7/116* (2013.01); *F16H 2057/005* (2013.01); *F16H 2057/02034* (2013.01)

(58) Field of Classification Search
CPC .......... F16H 57/02; F16H 3/72; F16H 57/023; F16H 2057/02034; F16H 2057/005; F16H 2037/047; H02K 7/116
See application file for complete search history.

(56) References Cited

U.S. PATENT DOCUMENTS

| | | | | |
|---|---|---|---|---|
| 7,628,727 | B2* | 12/2009 | Nagai | F16H 3/005 475/291 |
| 2005/0046290 | A1 | 3/2005 | Baukholt et al. | |
| 2006/0130600 | A1 | 6/2006 | Hasegawa et al. | |
| 2013/0255438 | A1 | 10/2013 | Kieninger | |
| 2015/0184584 | A1* | 7/2015 | Kuroda | F02B 37/186 475/149 |
| 2015/0377323 | A1* | 12/2015 | Koike | F16H 1/46 475/149 |
| 2017/0159753 | A1* | 6/2017 | Eberle | F16H 1/46 |

FOREIGN PATENT DOCUMENTS

| | | |
|---|---|---|
| DE | 102008030006 A1 | 12/2009 |
| EP | 2644309 A1 | 10/2013 |
| FR | 2934933 A1 | 2/2010 |
| JP | 2009-36071 A | 2/2009 |

OTHER PUBLICATIONS

International Search Report dated Jul. 5, 2016, issued in counterpart International Application No. PCT/DE2016/200176 (3 pages, including annex).

* cited by examiner

GEARED MOTOR, AND METHOD FOR INSTALLING A GEARED MOTOR

CROSS-REFERENCE TO RELATED APPLICATION

This application is a continuation application of International Application No. PCT/DE2016/200176, filed Apr. 7, 2016, which claims priority from German Application No. 10 2015 206 933.8, filed Apr. 16, 2015, the disclosures of which are incorporated herein by reference in their entireties.

BACKGROUND OF THE INVENTION

(1) Field of the Invention

The invention relates to a geared motor, comprising a direct current motor having a motor shaft, a planetary gear unit with a sun wheel, multiple planetary gears, a ring gear, a gear unit casing, a gear unit output shaft, and a pinion cage, wherein the planetary gears are engaged with teeth of the ring gear.

(2) Description of Related Art Including Information Disclosed Under 37 CFR 1.97 and 1.98

German Patent No. DE 19729988 C1 discloses a geared motor in which a planetary gear unit can be installed on an electric motor via a snap connection. The sun wheel is firmly connected with the shaft in the joining process. For this reason, it is necessary that the outer teeth of the sun wheel engage with three planetary gears simultaneously. Joining problems often occur because the angle position of the planetary gears among one another and with the ring gear does not automatically correctly align. This leads at least to a reduction of the installation speed. However, damage to the teeth may also occur, resulting in the development of noise during operation of the device. The problem especially exists in that the joining process must take place in a closed housing without the possibility of monitoring.

BRIEF SUMMARY OF THE INVENTION

It is therefore the objective of the invention to be able to perform the complete installation of the planetary gear unit independently of the final installation at the direct current motor, wherein the installation of the gear unit components may be well monitored; the teeth experience no damage upon installation, and therefore may be largely excluded as a source of noise; wherein the structural space is optimized in the axial direction; and the installation of the planetary gear unit at the direct current motor can be performed simply and without problems.

According to the subject invention, the planetary gears, the sun wheel and the gear unit output shaft are held in the gear unit case by a plate provided with a shaft exit and form a gear unit assembly, the planetary gear unit can be preinstalled and stored in the interim without problems. The sun wheel is thereby already arranged in the operating position, secured against loss, and engages with the teeth of the planetary gears. The sun wheel thereby has a shaft receptacle which is designed with a positive fit contour acting in the rotation direction, and is connected with a motor shaft without rotational play, or under the admission of a rotational play. A secure, rotary entrainment between motor shaft and sun wheel can thereby be ensured. The structural length can also be reduced via the preinstallation, because the sun wheel (motor pinion) does not need to have a cotter length.

The plate should advantageously serve as a thin thrust plate and serve as a retention component for the gear unit components before the final installation, and not as a component of the gear unit case. Axial structural space is thereby saved because an additional housing part may be omitted. The plate may, if required, be connected positively or non-positively with the gear unit case. For example, a bayonet joint is suitable as a positive fit.

Alternatively, a clamp joint is proposed, wherein the plate has an outer annular region in which reliefs are provided via which clamping tongues are limited. The reliefs produce an easier deflection capability of the clamping tongues.

In order to optimize axial securing, the plate is provided with an annular surface as a sun wheel thrust surface. The sun wheel thrust surface is thereby designed so that it generates no high frictional forces during operation. For this reason, the sun wheel thrust surface projects axially relative to a radially outwardly adjoining annular surface. Alternatively, the plate may also be designed flat and thus make a contribution to the axial structural space savings.

As was also already practiced in the prior art, it was proposed that the ring gear is of one piece with the gear unit casing. Installation times are hereby omitted, and the part count is reduced.

It is particularly advantageous if the inner circumferential area of the gear unit casing is free of teeth and is axially bounded by a stop surface. The clamping tongues may hereby be accordingly of simple design and do not need to be joined in the teeth.

In a development of the invention, it is provided that the planetary gears are borne on a pinion cage that has a central bearing clearance and is matched to the diameter of the motor shaft. The pinion cage can thereby be borne concentrically on the extended segment of the motor shaft. The longer motor shaft is reasonable in order to enable an easy finding of the positive fit in the sun wheel before the installation of the direct current motor at the planetary gear unit, without increasing the structural length of the geared motor.

In principle, the invention can be applied to an arbitrary number of stages. It is at least provided that the second pinion cage is of one piece with a secondary sun wheel which engages with secondary planetary gears, and that the secondary planetary gears engage with the teeth of the ring gear.

The part count can be further reduced in that the gear unit output shaft is borne in a bearing sleeve of one piece with the gear unit casing, and the length of the annular bearing surface is greater than the diameter of the gear unit output shaft.

A simple installation of the planetary gear unit is facilitated in that the gear unit casing is of one piece with snap means. In a plastic shaping process, the connection means are co-extruded without increased expenditure. The snap means are especially formed in the shape of frame-like snap windows.

Since the use of standard motors is also often of economic interest, it may be reasonable to provide an adapter as an interface between the direct current motor and the planetary gear unit. This adapter is then designed so that it is of one piece with snap means which correspond with the snap windows of the gear unit casing. Suitable for this are snap detents that are arranged on the periphery of the adapter. A structural space-saving alternative to a snap connection exists in the possibility of welding the gear unit casing to the adapter.

A second achievement of the invention is provided via a method to install a geared motor, comprised of a direct current motor having a motor shaft, a planetary gear unit with a sun wheel, multiple planetary gears, a gear unit casing which is of one piece with a ring gear, and a gear unit output shaft which is of one piece with a pinion cage, and a plate.

The installation steps according to the invention are thereby: a) provide the gear unit casing, the gear unit output shaft, the planetary gears, the sun wheel and the plate; b) axial installation of the gear unit output shaft in the gear unit casing; c) axial installation of the planetary gears on the first pinion cage and in the ring gear of the gear unit casing; d) axial installation of the sun wheel and engagement with the planetary gears; e) installation of the disc in the gear unit casing; f) finding the correct angle position between motor shaft and sun wheel; g) insertion of the motor shaft into the sun wheel. The finding of the correct angle position may thereby take place manually or via an automatic action. In each instance, a sufficient visual monitoring capability of this joining process is provided. Damage to the gear teeth may be precluded via this mode of installation. The installation method can be applied in the same manner given single- and multistage planetary gear units. In principle, it can also be applied to other gear unit types.

BRIEF DESCRIPTION OF THE SEVERAL VIEWS OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE INVENTION

Figure 1:
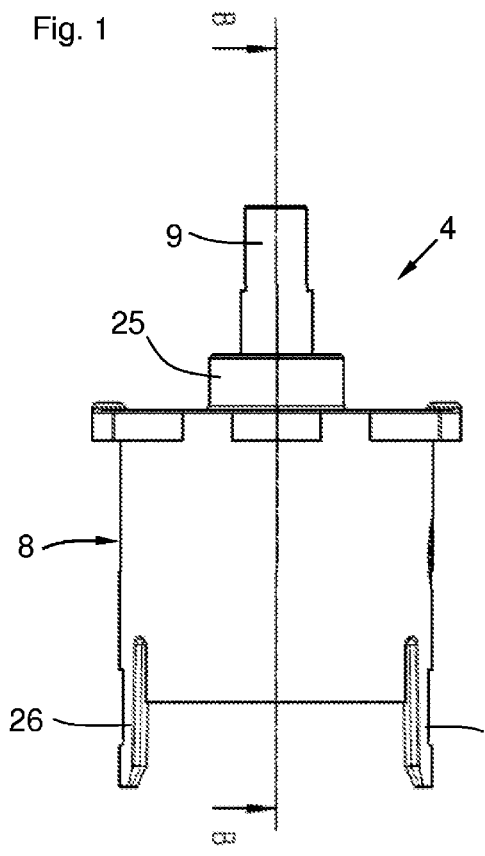
FIG. 1 a plan view of a planetary gear unit.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1 shows a plan view of a planetary gear unit 4, with a gear unit casing 8, a bearing sleeve 25, a gear unit output shaft 9 and snap window 26. The bearing sleeve 25 and the snap windows 26 are manufactured as one piece with the gear unit casing 8 in a plastic shaping process. In the present example, two snap windows 26 are apparent; if necessary, a greater number of snap means can also be provided. The gear unit output shaft 9 is accommodated within the bearing sleeve 25 and carried so as to be able to rotate.

Figure 2:
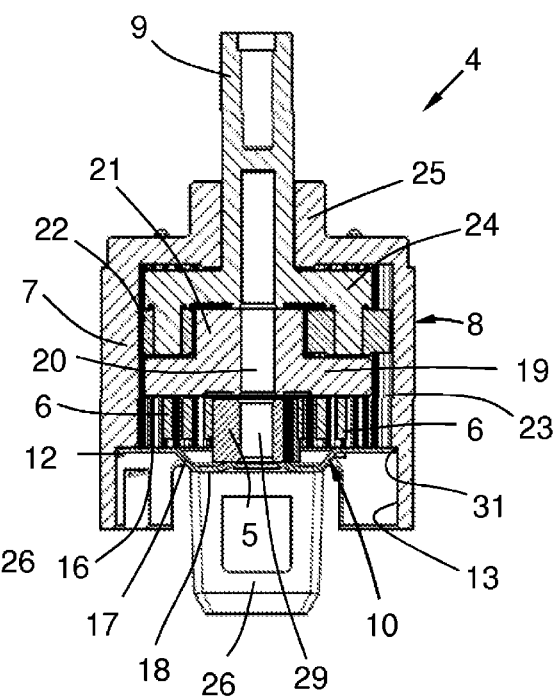
FIG. 2 a section B-B of the planetary gear unit of FIG. 1.

FIG. 2 shows a section B-B of the planetary gear unit 4, with the gear unit casing 8, the snap windows 26, the bearing sleeve 25, the gear unit output shaft 9 which is of one piece with a secondary pinion cage 24 on which secondary planetary gears 22 are borne so as to be rotatable. The secondary pinion cage 24 is engaged on the one hand with teeth 23 of a ring gear 7 and on the other hand with the teeth of a secondary sun wheel 21. The secondary sun wheel 21 is of one piece with a first pinion cage 19 having a bearing recess 20 and bears first planetary gears 6 which are engaged on the one hand with teeth 23 of the ring gear 7 and on the other hand with the teeth of a first sun wheel 5, wherein the sun wheel includes a shaft receptacle 29. The first sun wheel 5, the first planetary gears 6, the first pinion cage 19, the secondary planetary gears 22, and the secondary pinion cage 24 are axially secured by a plate 10 which radially grips a non-toothed inner area 13 of the gear unit casing 8 and axially rests on a stop surface 31. The stop surface 31 is partially defined by a beginning of teeth of the ring gear 7 and allows a very precise axial positioning of the plate. The plate 10 has an annular surface 18 and an outer annular area 16 which are connected with one another by a transition region 17. The clamping with the non-toothed inner area 13 takes place via clamping tongues 12.

Figure 3:
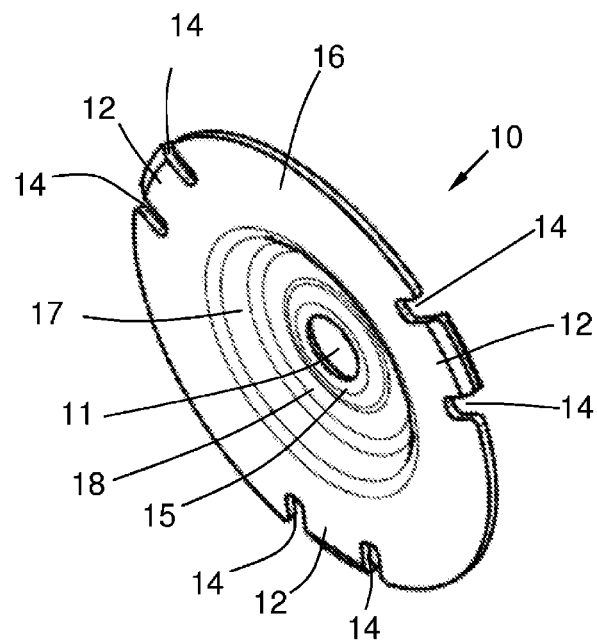
FIG. 3 a spatial representation of a plate.

FIG. 3 shows an enlarged spatial presentation of the plate 10, with a shaft passage 11, a sun wheel thrust surface 15, the annular surface 18 adjoining this, the transition region 17, the outer annular region 16, and the clamping tongues 12 which are partially separated from the outer annular region 16 by slit-like clearances 14 and thereby achieve a flatter spring characteristic. The clamping tongues 12 extend radially beyond the outer annular region 16 so that a clamping takes place only via the clamping tongues 12. Three clamping tongues with an angle spacing of 120° are advantageously provided so that the plate 10 self-centers in the joining process. The sun wheel thrust surface 15, the annular surface 18 and the outer annular region 16 with the clamping tongues 12 are located in different axial planes, wherein the sun wheel thrust surface 15 projects only slightly relative to the annular surface 18. The outer annular region 16 has a more distinct axial separation from the annular surface 18, wherein the transition region 17 forms a conical annular surface. The axial separation of the outer annular region 16 from the sun wheel thrust surface, and the spatial region that is thereby achieved, is axially taken up by the sun wheel 5 (see FIG. 2). The plate may be shaped as a plastic component in an injection mold, or as a stamped bent part may be stamped from a metal sheet or from a roll belt.

Figure 4:
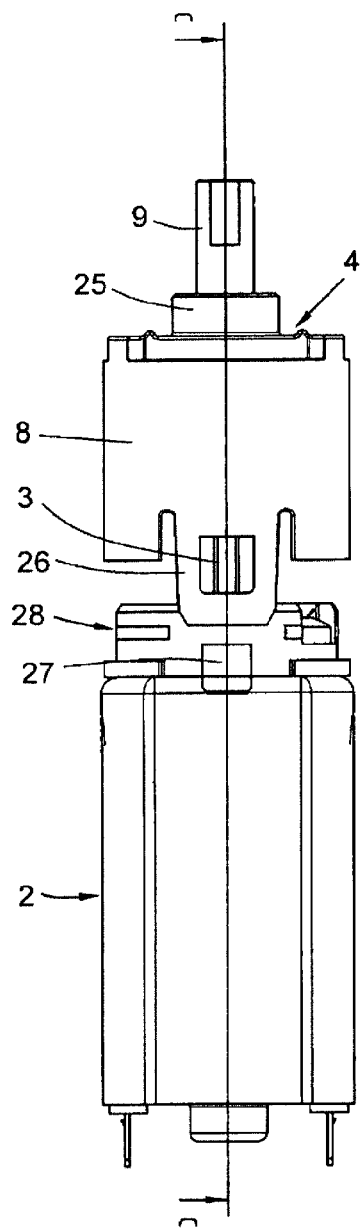
FIG. 4 the planetary gear unit and a direct current motor before the final installation, FIG. 5 a section C-C of the arrangement according to FIG. 4, FIG. 6 the planetary gear unit and the direct current motor after the final installation, and FIG. 7 a section D-D of the arrangement according to FIG. 6.

FIG. 4 shows the planetary gear unit 4 and a direct current motor 2 before the final installation, with the gear unit casing 8, the bearing sleeve 25, the output shaft 9, the snap window 26, the motor shaft 3, the adapter 28 and the snap detent 27. If the installation is performed in a device (not shown), a precisely central association can be produced between the components (planetary gear unit and direct current motor) to be joined so that the motor shaft end may be inserted without problems into the shaft receptacle 29. In order to further facilitate this, the shaft end may be designed crowned or in the shape of a frustum, and the shaft receptacle 29 may be provided with a conical insertion bevel. The angular association of the snap means (snap window 26 and snap detent 27) can be produced simply in the device.

Figure 5:
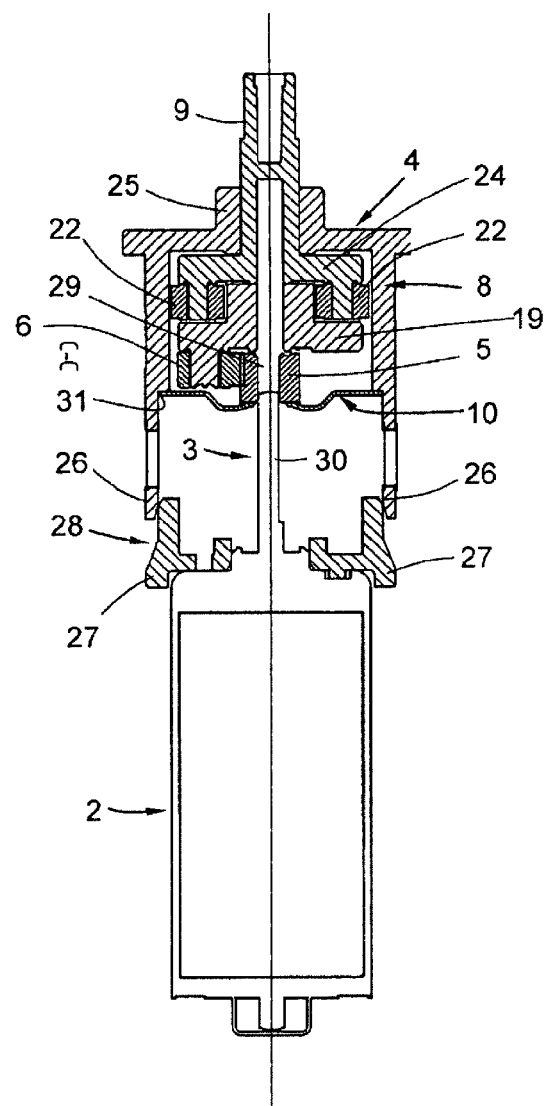

FIG. 5 shows a section C-C of the arrangement according to FIG. 4, with the direct current motor 2; the motor shaft 3 which has a flattening 30 and thereby has a D-shaped cross section; the adapter 28; the snap detent 27; the planetary gear unit 4 with the gear unit casing 8; the snap windows 26; the sun wheel 5; the shaft receptacle 29; the planetary gear 6; the first pinion cage 19; the secondary planetary gears 22; the secondary pinion cage 24 that is of one piece with the gear unit output shaft 9; and the plate 10 that rests axially on a stop surface 31 of the gear unit casing 8.

Figure 6:
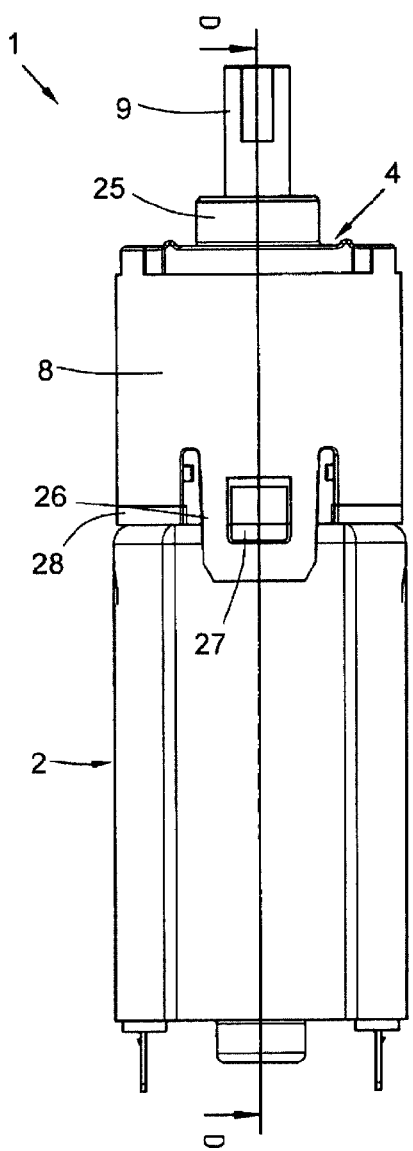

FIG. 6 shows the planetary gear unit 4 and a direct current motor 2 after the final installation, with the gear unit casing 1, the adapted 28, the snap detents 27, the gear unit casing 26 with the snap windows 26 and the bearing sleeve 25; as well as the gear unit output shaft 9.

Figure 7:
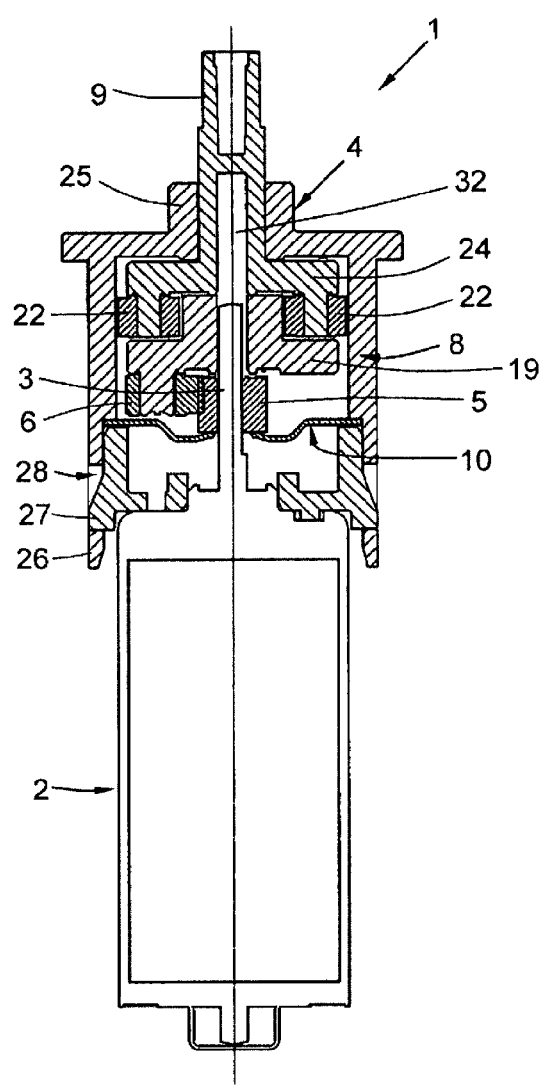

FIG. 7 shows a section D-D of the arrangement according to FIG. 6, with the geared motor 1; the motor shaft 3; the adapter 28; the snap detents 27; the gear unit casing 8 with the snap windows 26; the bearing sleeve 25; the plate 10; the sun wheel 5; the planetary gear 6; the pinion cage 19; the secondary planetary gears 22; the secondary pinion cage 24; and the gear unit output shaft 9 formed as one piece therewith. The motor shaft 3 is extended so far that it serves as an accommodation for the pinion cage 19. The gear unit output shaft 9 is formed with a cylindrical cavity 32 that is designed so that, if necessary, the motor shaft may be extended so far that it might extend into the region of the bearing sleeve 25.

Now that the components of the geared motor have been described, the actual working of the geared motor will be discussed. With reference to FIGS. 1-3, since the planetary gears 6, the first sun wheel 5 and the gear unit output shaft 9 are held in the gear unit case 8 by a plate 10 provided with a shaft exit 11 and form a gear unit assembly, the planetary gear unit can be preinstalled and stored in the interim without problems. The sun wheel 5 is thereby already arranged in the operating position, secured against loss, and engages with the teeth of the planetary gears. The first sun wheel 5 thereby has a shaft receptacle 29 which is designed with a positive fit contour acting in the rotation direction, and is connected with the motor shaft 3 without rotational play, or under the admission of a rotational play. A secure, rotary entrainment between motor shaft 3 and sun wheel 5 can thereby be ensured. The structural length can also be reduced via the preinstallation, because the sun wheel (motor pinion) does not need to have a cotter length. The invention can be applied similarly to single- and multistage planetary gear units.

The plate 10 should advantageously serve as a thin thrust plate and serve as a retention component for the gear unit components before the final installation, and not as a component of the gear unit case 8. Axial structural space is thereby saved because an additional housing part may be omitted. The plate 10 allows a greater flexibility in the production and logistics of the part preparation because the planetary gear unit 4 can be preinstalled independently of the direct current motor 2.

The plate 10 may, if required, be connected positively or non-positively with the gear unit case 8. For example, a bayonet joint is suitable as a positive fit. Alternatively, a clamp joint is proposed, wherein the plate 10 has an outer annular region 16 in which reliefs 14 are provided via which clamping tongues 12 are delimited. The reliefs 14 produce an easier deflection capability of the clamping tongues. As an example, the reliefs are designed as slits 14 whose depth may be varied in order to adapt the spring properties.

The plate 10 designed in such a manner is superbly suited to secure the previously installed gear unit modules in the gear unit casing in that their clamping tongues 12 seize on an inner circumferential region 13 of the gear unit casing 8.

In order to optimize this axial securing, the plate 10 is provided with an annular surface as a sun wheel thrust surface 15. The sun wheel thrust surface 15 is thereby designed so that it generates no high frictional forces during operation. For this reason, the sun wheel thrust surface 15 projects axially relative to a radially outwardly adjoining annular surface 18. In general, a small play should be present between the sun wheel 5 and the plate 10 so that no braking effect occurs. Alternatively, the plate 10 may also be designed flat and thus make a contribution to the axial structural space savings.

The plate 10 should advantageously be made of metal or plastic. Both can be simply manufactured. Which material is used depends on the mechanical loads to be expected, or on the motor design.

As was also already practiced in the prior art, it was proposed that the ring gear 7 is of one piece with the gear unit casing 8. Installation times are hereby omitted, and the part count is reduced.

It is particularly advantageous if the inner circumferential area 13 of the gear unit casing 8 is free of teeth and is axially bounded by a stop surface 31. The clamping tongues 12 may hereby be accordingly of simple design and do not need to be joined in the teeth. Via the stop it is prevented that the disc is driven too far forward, whereby jamming of the gear unit components would occur. Due to the precise manufacturing capability of plastic parts, the required tolerances can hereby be very precisely complied with.

In a development of the invention, it is provided that the first planetary gears 6 are borne on the first pinion cage 19 which has a central bearing clearance 20 and is matched to the diameter of the motor shaft 3. The first pinion cage can hereby be borne concentrically on the extended segment of the motor shaft 3. The longer motor shaft is reasonable in order to enable an easy finding of the positive fit in the sun wheel 5 before the installation of the direct current motor 2 at the planetary gear unit 4, without increasing the structural length of the geared motor 1.

In principle, the invention can be applied to an arbitrary number of stages. It is at least provided that the first pinion cage 19 is of one piece with a secondary sun wheel 21 which engages with secondary planetary gears 22, and that the secondary planetary gears 22 engage with the teeth 23 of the ring gear 7. The gear unit can be most simply manufactured in that the ring gear 7 is executed with identical inner teeth continuously from the first to the last planetary gear unit stage.

The secondary planetary gears 22 should reasonably be borne on a secondary pinion cage 24, which is of one piece with the gear unit output shaft 9.

The part count can be further reduced in that the gear unit output shaft 9 is borne in a bearing sleeve 25 of one piece with the gear unit casing 8, and the length of the annular bearing surface is greater than the diameter of the gear unit output shaft 9. The gear unit output shaft may thereby be executed from a plastic material.

A simple installation of the planetary gear unit 4 is facilitated in that the gear unit casing 8 is of one piece with snap means 26. In a plastic shaping process, the connection means are co-extruded without increased expenditure. The snap means are especially formed in the shape of frame-like snap windows 26.

Since the use of standard motors is also often of economic interest, it may be reasonable to provide an adapter as an interface between the direct current motor and the planetary gear unit. This adapter is then designed so that it is of one piece with snap means which correspond with the snap windows 26 of the gear unit casing. Suitable for this are snap detents that are arranged on the periphery of the adapter 28

(FIG. 4). A structural space-saving alternative to a snap connection exists in the possibility of welding the gear unit casing to the adapter.

A second achievement of the invention is provided via a method to install a geared motor, comprised of a direct current motor 2 having a motor shaft 3, a planetary gear unit 4 with the first sun wheel 5, multiple planetary gears 6, a gear unit casing 8 which is of one piece with a ring gear 7, and a gear unit output shaft 9 which is of one piece with the secondary pinion cage 24, and a plate 10. The installation steps according to the invention are thereby: a) provide the gear unit casing 8, the gear unit output shaft 9, the planetary gears 6, the sun wheel 5 and the plate 10; b) axial installation of the gear unit output shaft 9 in the gear unit casing 8; c) axial installation of the planetary gears 6 on the pinion cage 24 and in the ring gear 7 of the gear unit casing 8; d) axial installation of the sun wheel 5 and engagement with the planetary gears 6; e) installation of the disc 10 in the gear unit casing 8; f) finding the correct angle position between motor shaft 3 and sun wheel 5; g) insertion of the motor shaft 3 into the sun wheel 5. The finding of the correct angle position may thereby take place manually or via an automatic action. In each instance, a sufficient visual monitoring capability of this joining process is provided. Damage to the gear teeth may be precluded via this mode of installation.

In that the motor shaft 3 is inserted beyond the sun wheel 5 into a bearing recess 20 of the pinion cage 19, the length of the motor shaft 3 may be chosen to be distinctly longer than given a conventional gear unit. This significantly facilitates the joining process without affecting the structural length of the geared motor.

It is provided that the gear unit casing 8 is mechanically connected with an adapter 28 or a motor housing. The connection may be produced via snapping or also via welding. Laser welding is preferred as a welding method because this can be used in a manner that is very gentle to the component and has process reliability.

It is to be understood that the present invention is not limited to the illustrated embodiments described herein. Various types and styles of user interfaces may be used in accordance with the present invention without limitation. Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

LIST OF REFERENCE SYMBOLS

1 Geared motor
2 Direct current motor
3 Motor shaft
4 Planetary gear unit
5 Sun wheel
6 Planetary gear
7 Ring gear
8 Gear unit casing
9 Gear unit output shaft
10 Plate
11 Shaft passage
12 Clamping tongue
13 Inner circumferential region
14 Recess
15 Sun wheel thrust surface
16 Outer annular region
17 transition region
18 Annular surface
19 Pinion cage
20 Bearing clearance
21 Secondary sun wheel
22 Secondary planetary gears
23 Teeth
24 Secondary pinion cage
25 Bearing sleeve
26 Snap window
27 Snap detent
28 Adapter
29 Shaft receptacle
30 Flattening
31 Stop surface
32 Cavity

What is claimed is:

1. A geared motor comprising:
a direct current motor having a motor shaft;
an independent planetary gear unit with a first sun wheel, the planetary gear unit having at least one planetary gear unit stage;
a ring gear having teeth;
first planetary gears engaged with the teeth of the ring gear;
a gear unit casing having an inner circumferential region;
a gear unit output shaft;
a first pinion cage;
a second pinion cage with a secondary sun wheel;
secondary planetary gears secured to the second pinion cage;
a plate positioned within the inner circumferential region independent of the direct current motor, the plate having a sun wheel thrust surface for retaining the first sun wheel in place within the gear casing, the plate having a region for axially retaining the secondary sun wheel, the first and secondary planetary gears and the first and second pinion cages in the gear unit casing, the plate provided with a shaft passage to form a preassembled planetary gear unit; and the first sun wheel having a central shaft receptacle which is formed with a positive fit contour acting in the rotation direction and coupled in a rotationally fixed manner with the motor shaft via a corresponding positive fit contour.

2. The geared motor according to claim 1, wherein the plate serves not as part of the gear unit casing.

3. The geared motor according to claim 1, wherein the plate is connected positively with the gear unit casing.

4. The geared motor according to claim 1, wherein the plate has an outer annular region in which reliefs are provided via which clamping tongues are delimited.

5. The geared motor according to claim 4, wherein the plate is clamped via the clamping tongues to the inner circumferential region of the gear unit casing.

6. The geared motor according to claim 1, wherein the sun wheel thrust surface projects axially relative to a radially outwardly adjoining annular surface.

7. The geared motor according to claim 1, wherein the plate is a flat plate.

8. The geared motor according to claim 1, wherein the ring gear is of one piece with the gear unit casing.

9. The geared motor according to claim 1, wherein the inner circumferential area of the gear unit casing is free of teeth and is axially bounded by a stop surface.

10. The geared motor according to claim 1, wherein the secondary planetary gears are borne on a second pinion cage which has a central bearing clearance and is matched to the diameter of the motor shaft.

11. The geared motor according to claim 1, wherein the gear unit output shaft is borne in a bearing sleeve formed in one piece with the gear unit casing, and the length of an annular bearing surface is greater than the diameter of the gear unit output shaft.

12. A geared motor comprising:
a direct current motor having a motor shaft;
a planetary gear unit with a first sun wheel, the planetary gear unit having at least one planetary gear unit stage;
a ring gear having teeth;
first planetary gears engaged with the teeth of the ring gear;
a gear unit casing;
a gear unit output shaft; and
a first pinion cage;
a second pinion cage with a secondary sun wheel;
secondary planetary gears secured to the second pinion cage, which has a central bearing clearance and is matched to the diameter of the motor shaft;
a plate for axially holding the first and secondary sun wheels, the first and secondary planetary gears and the first and secondary pinion cages in the gear unit casing, the plate provided with a shaft passage to form a preinstallation module; the first sun wheel having a central shaft receptacle which is formed with a positive fit contour acting in the rotation direction and coupled in a rotationally fixed manner with the motor shaft via a corresponding positive fit contour; and wherein, in the preinstallation module, an engagement of teeth of the first sun wheel with teeth of the first planetary gears is provided both before and after a final installation of the direct current motor at the preinstallation module;
wherein the motor shaft extends beyond the first sun wheel within the bearing clearance of the second pinion cage.

13. The geared motor according to claim 10, wherein the first pinion cage and a secondary sun wheel are formed as one piece and the secondary sun wheel engages with secondary planetary gears, and the secondary planetary gears engage with the teeth of the ring gear.

14. The geared motor according to claim 13, wherein the secondary planetary gears are borne on a secondary pinion gear which with the gear unit output shaft are formed as one piece.

15. A method to install a geared motor, made up of a direct current motor having a motor shaft, an independent planetary gear unit with a first sun wheel, a first pinion cage, first planetary gears, a gear unit casing having an inner circumferential region which is formed in one piece with a ring gear, and a gear unit output shaft which is of one piece with a secondary pinion cage, and a plate, the method comprising steps of:

a) providing the gear unit casing, the gear unit output shaft, the first planetary gears, the first sun wheel and the plate;
b) axially installing the gear unit output shaft in the gear unit casing;
c) axially installing the first planetary gears on the first pinion cage and in the ring gear of the gear unit casing;
d) axially installing the first sun wheel in engagement with the first planetary gears;
e) installing the plate within the circumferential region of the gear unit casing independent of the direct current motor, the plate having a sun wheel thrust surface for retaining the first sun wheel in place within the gear casing, and the plate having a region for axially retaining the secondary sun wheel, the first and secondary planetary gears and the first and secondary pinion cages in the gear unit casing, the plate provided with a shaft passage to form a preassembled planetary gear unit;
f) finding the correct angle position between motor shaft and the first sun wheel; and
g) inserting the motor shaft into the first sun wheel, the motor shaft being inserted beyond the first sun wheel into a bearing clearance of the second pinion cage.

16. A method to install a geared motor, made up of a direct current motor having a motor shaft, a planetary gear unit with a first sun wheel, a first pinion cage, first planetary gears, a gear unit casing which is formed in one piece with a ring gear, and a gear unit output shaft which is of one piece with a secondary pinion cage, and a plate, the method comprising steps of:

a) providing the gear unit casing, the gear unit output shaft, the first planetary gears, the first sun wheel and the plate;
b) axially installing the gear unit output shaft in the gear unit casing;
c) axially installing the first planetary gears on the first pinion cage and in the ring gear of the gear unit casing;
d) axially installing the first sun wheel in engagement with the first planetary gears;
e) installing the plate in the gear unit casing;
f) finding the correct angle position between motor shaft and the first sun wheel; and
g) inserting the motor shaft into the first sun wheel, the motor shaft being inserted beyond the first sun wheel into a bearing clearance of the second pinion cage.

17. The method according to claim 16, wherein the gear unit casing is welded to an adapter or a motor housing.

18. The method according to claim 17, wherein the gear unit casing is laser-welded to the adapter or the motor housing.

19. The method according to claim 16, wherein at least one additional planetary gear unit stage is installed between the first sun wheel and the gear unit output shaft which is made up of the second pinion cage with integral secondary sun wheel and secondary planetary gears.

* * * * *